Nov. 3, 1959 S. A. FRANCIS ET AL 2,911,572

HIGH DENSITY ELECTRONIC PACKAGING

Filed May 20, 1958 6 Sheets-Sheet 1

INVENTORS
SAMUEL A. FRANCIS
PHILIP J. GRAY
BY
Moses, Nolte, & Nolte
ATTORNEYS

INVENTORS
SAMUEL A. FRANCIS
PHILIP J. GRAY
BY
Moses, Nolte, & Nolte
ATTORNEYS

HIGH DENSITY ELECTRONIC PACKAGING

Filed May 20, 1958 6 Sheets-Sheet 3

INVENTOR
SAMUEL A. FRANCIS
PHILIP J. GRAY
BY
Moses, Nolte, & Nolte
ATTORNEYS

Nov. 3, 1959 S. A. FRANCIS ET AL 2,911,572

HIGH DENSITY ELECTRONIC PACKAGING

Filed May 20, 1958 6 Sheets-Sheet 4

INVENTORS
SAMUEL A. FRANCIS
PHILIP J. GRAY
BY
Moses, Nolte, & Nolte
ATTORNEYS

Nov. 3, 1959 S. A. FRANCIS ET AL 2,911,572

HIGH DENSITY ELECTRONIC PACKAGING

Filed May 20, 1958 6 Sheets-Sheet 5

INVENTORS
SAMUEL A. FRANCIS
PHILIP J. GRAY
BY
Moses, Nolte, & Nolte
ATTORNEYS

INVENTORS
SAMUEL A. FRANCIS
PHILIP J. GRAY
BY
Moses, Nolte, & Nolte
ATTORNEYS

United States Patent Office 2,911,572
Patented Nov. 3, 1959

2,911,572

HIGH DENSITY ELECTRONIC PACKAGING

Samuel A. Francis, Marion, and Philip J. Gray, Marshfield, Mass., assignors, by mesne assignments, to The Sippican Corporation, Marion, Mass., a corporation of Massachusetts Application May 20, 1958, Serial No. 736,529

15 Claims. (Cl. 317—101)

The present invention relates to electronic assemblies and to a method of making such electronic assemblies and packaging such assemblies so that they occupy a minimum of space.

The necessity for building high performance electronic systems within limited spaces has placed increasing emphasis on equipment miniaturization. Miniaturization, however, has generally produced many difficulties in electronic assembly, and the difficulties of providing adequate reliability, accessibility and heat removal increase drastically as size decreases. It is, therefore, an object of the present invention to provide high density packaging of electronic equipment in which these and other difficulties are reduced considerably while at the same time providing assemblies capable of withstanding large shock and vibration forces.

According to the invention, the components are assembled into units. The units may be constructed in various shapes as, for example, in the form of wafers or long sticks of substantially rectangular cross section, whereby the units are capable of being stacked. The units are formed by welding the component leads to bus wires or to other component leads to form a plurality of sub-assemblies. The sub-assemblies are then interconnected to form the assembled unit. Portions of some of the bus wires, which may be in the form of ribbons, bars, etc., are then cut away to individualize the connections to the various stages of the electronic apparatus. Each assembled unit may thereafter be potted in a suitable compound. A plurality of the completed assemblies may be placed in a parallelepiped or cubic array and held together by passing wires through the assemblies and placing these wires under tension by anchoring the ends of the wires in suitable retainers on the sides of the array. For large assemblies, heat removal means are provided. For this purpose, thin sheets of materal with high heat conductivity are interleaved in parallel planes among the units assembled in the cube. These sheets are attached to a heat transfer medium such as a cold plate type heat exchanger which may be attached to a suitable heat sink. The tension wires holding the sticks together are used to attach the cold plate to one face of the cube. The structural strength of such a cold plate is made sufficiently high to serve as an effective structural support for the entire assembly, and it can be readily securely attached to a structure in which it is to be installed.

One important feature of the invention is the use of resistance welding instead of the usual soldering. This welding technique is described in "Welded Joints" by S. G. Lutz, Electronics, November, 1954. The minute amount of heat transmitted to the components in resistance welding permits the very important result that each component can be in physical contact with its neighbors as far as possible. In turn, the very close packing of components gives the assembly sufficient compressive and tensile strength to make it rigid and eliminate the need of supporting structures.

Other objects and advantages of the invention will become evident, and the invention itself will be fully understood from the following description and accompanying drawings in which.

Figures 1, 2:
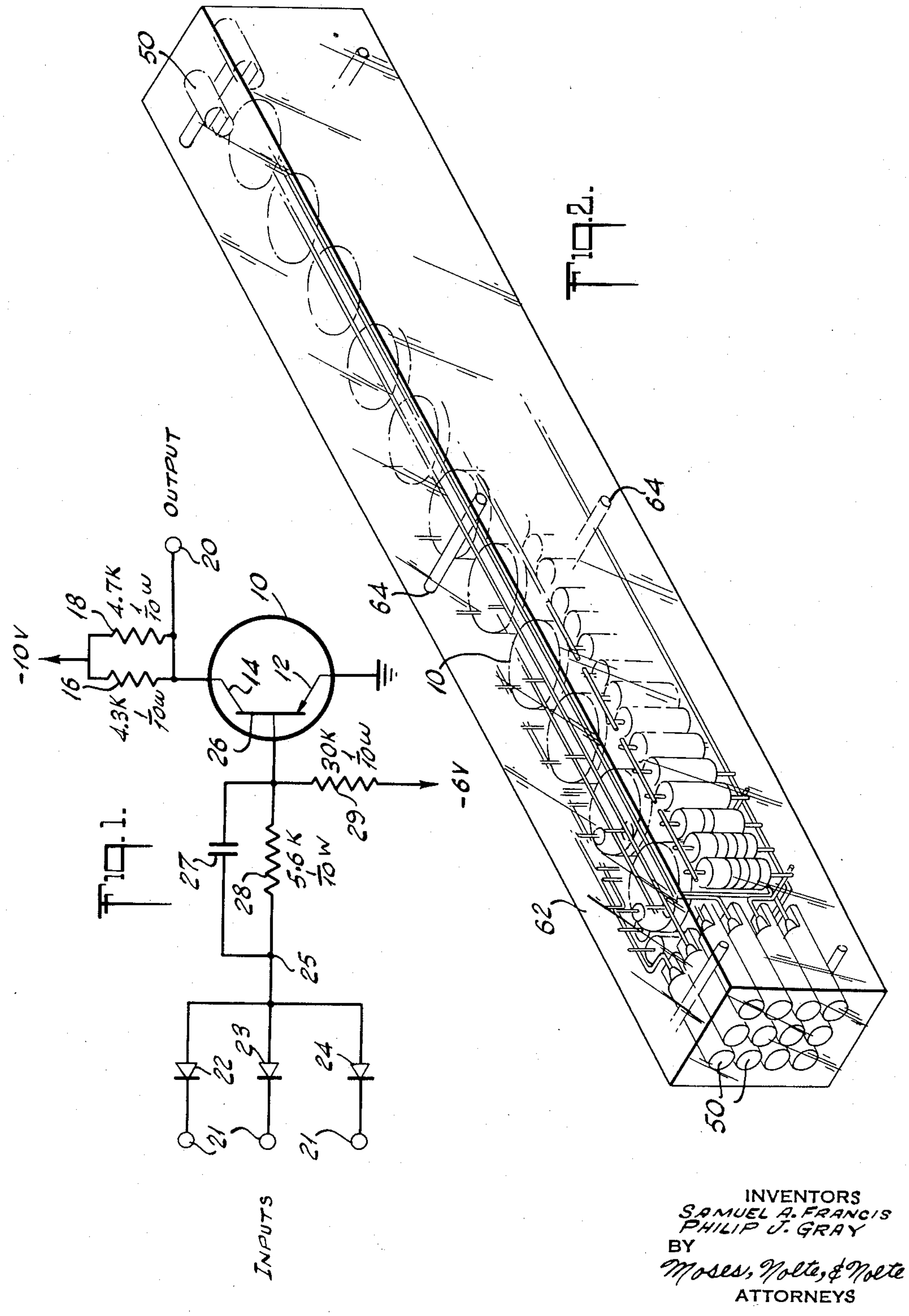
Fig. 1 is a schematic circuit of an amplifier constituting one stage of the apparatus.
Fig. 2 is an isometric view illustrating the general form of one assembly unit.
Figure 8:
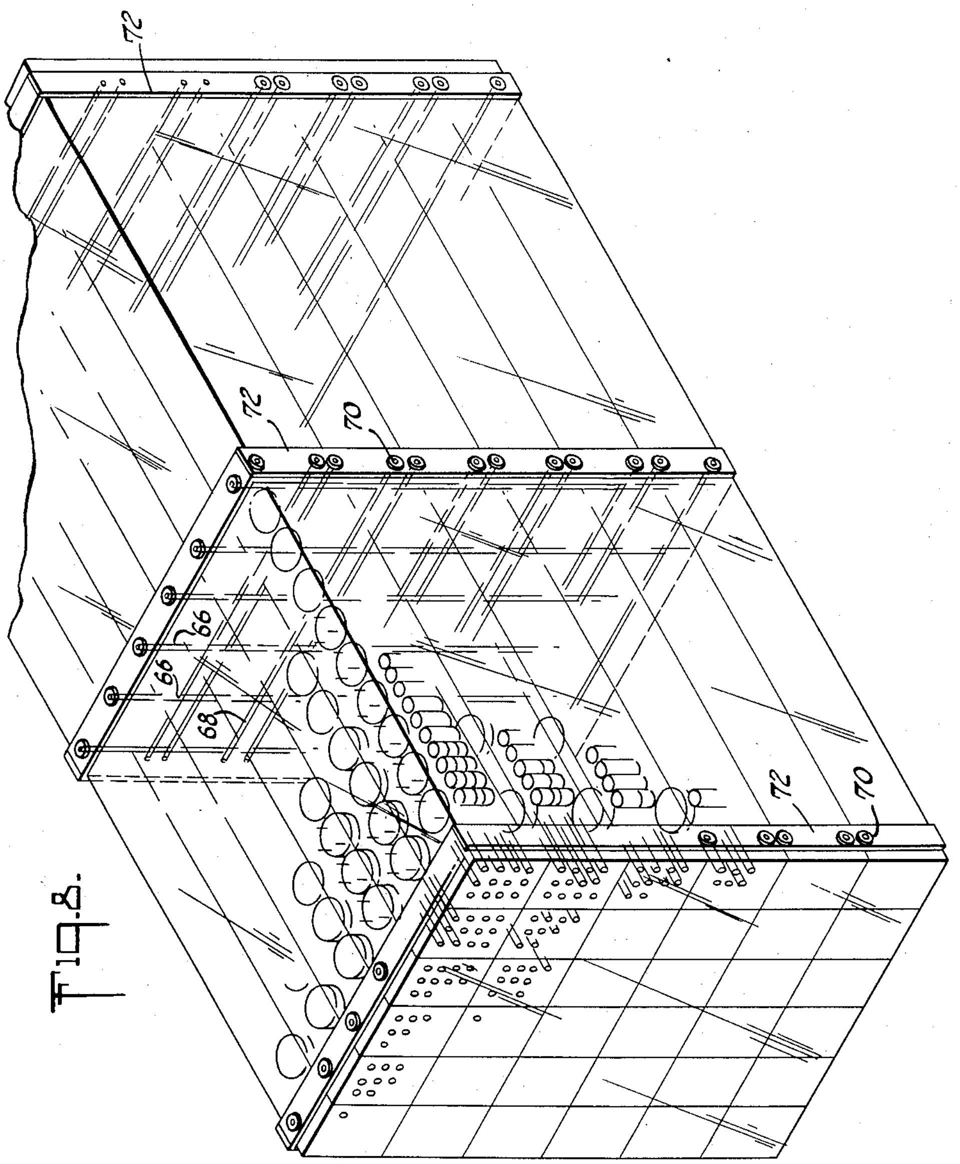
Fig. 8 is an isometric view showing the general arrangement of a package consisting of 36 stick assemblies.
Figure 9:
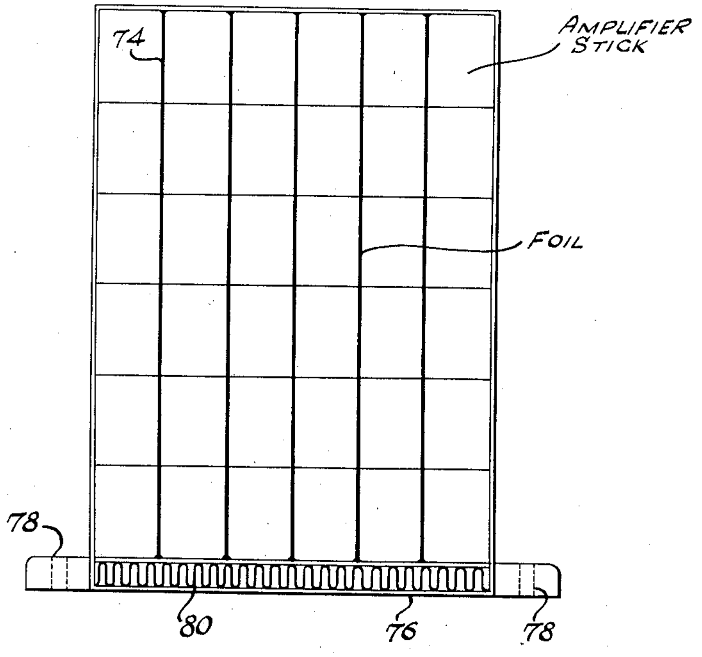
Fig. 9 is a schematic sectional view of a package similar to that shown in Fig. 11 provided with heat removal means.
Figure 10:
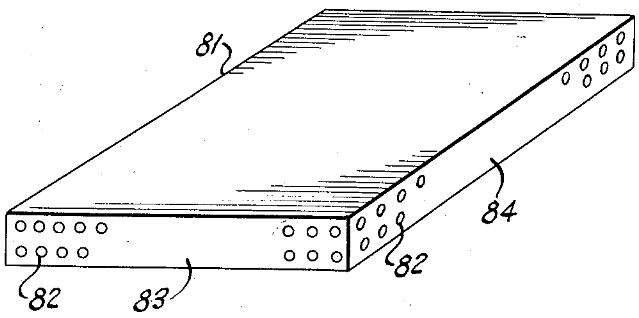
Fig. 10 is an isometric view of an assembly in the form of a rectangular wafer.

In order to exemplify the invention, it will be assumed that a large number of transistor circuits, which may be amplifier circuits such as shown in Fig. 1, are to be incorporated in rectangular units of the type shown in Fig. 2 or Fig. 10 and that these units may then be combined into a cubic assembly, one form of which is illustrated in Figs. 8 and 9. The assembly shown in Fig. 2 is composed of three pairs of sub-assemblies which are interconnected to form a plurality of amplifier stages of the type shown in Fig. 1.

Figure 3:
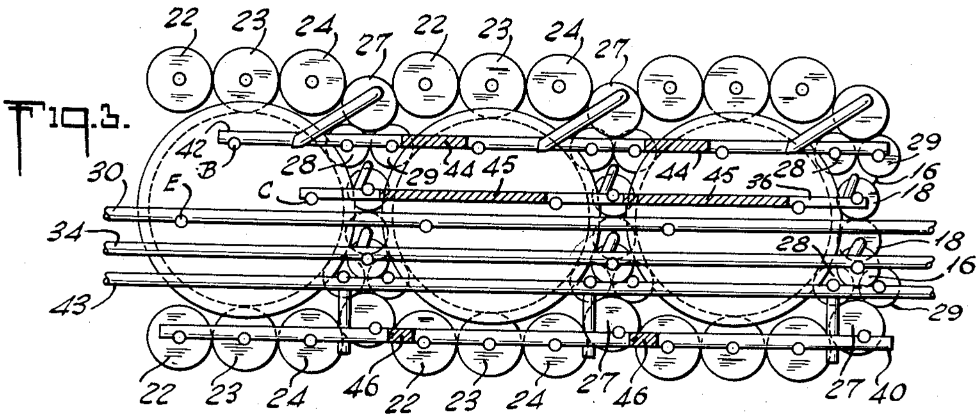
Fig. 3 is a partial top view showing three modules after the several sub-assemblies have been combined.
Figure 4:
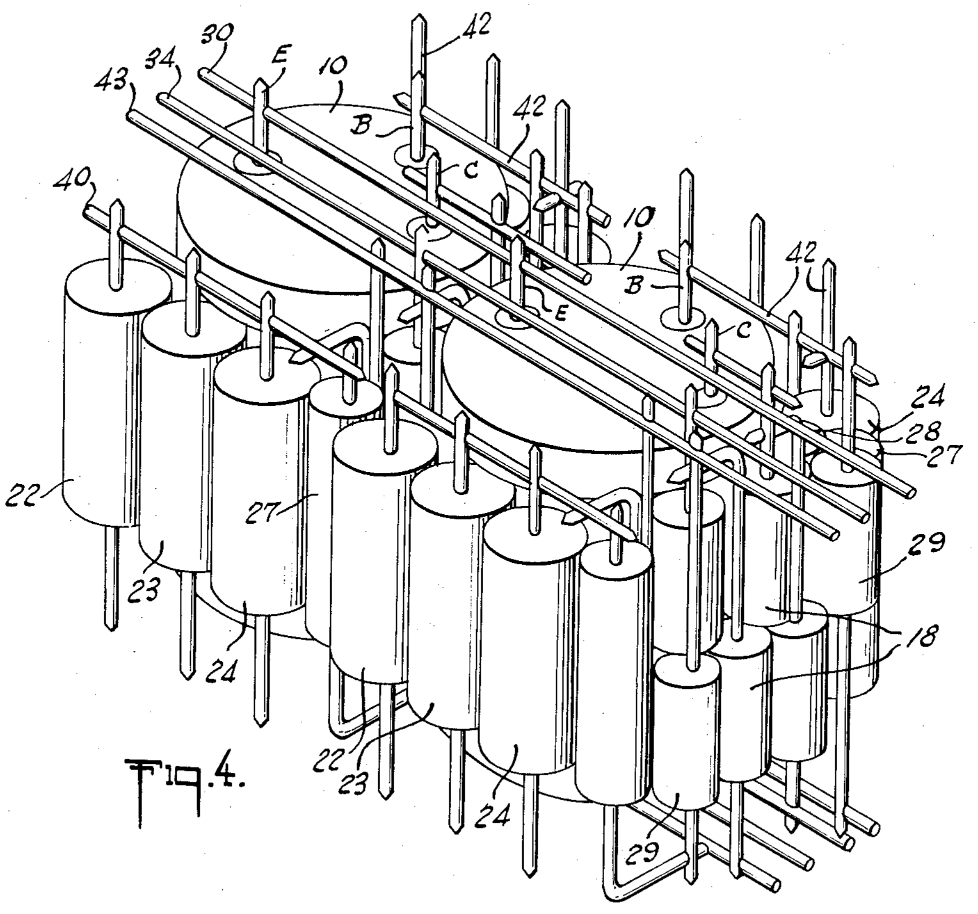
Fig. 4 is a partial isometric view showing several modules after the sub-assemblies have been combined.
Figure 5A:
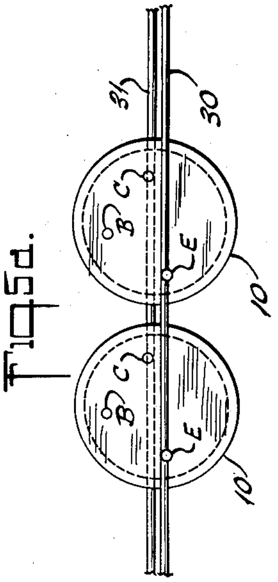
Figure 5:
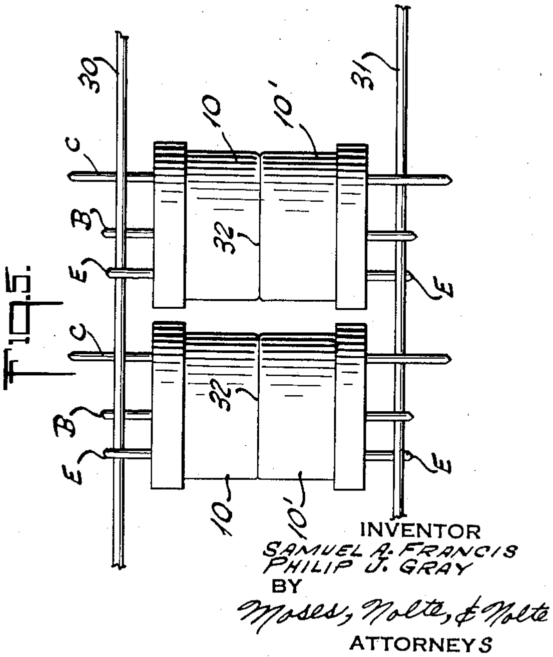

Referring to Fig. 1, the circuit shown therein is a transistor amplifier. The transistor 10 may be of the 2N–416 type, which is in the form of a cylinder having all its electrodes on one flat face, which is hereafter called front face of the transistor. In the particular amplifier, here chosen for purposes of illustration, the emitter 12 is grounded and the collector 14 is connected through a pair of parallel resistors 16 and 18 to a suitable source of negative voltage which may be, for example, −10 volts. Collector 14 is also connected to an output terminal 20. Three input terminals 21 are connected through diodes 22—24 to a junction point 25. The input signals at junction 25 are supplied to base electrode 26 through a capacitor 27 in parallel with a resistor 28. A suitable bias of say +6 volts may be impressed on base electrode 26 through resistor 29. The various stages may be similar to that illustrated in Fig. 1, except that some stages may have anywhere from one to five inputs, and the various stages will be interconnected by so-called logic wiring of the type well known in digital computer construction. The emitter, base and collector electrodes are indicated in Figs. 3, 4, and 5 and other figures by letters E, B, and C.

The various sub-assemblies of which the complete assemblies are composed, are formed with the aid of suitable jigs which for the sake of simplicity will not be illustrated herein. A first sub-assembly is constructed by placing a row of transistors 10 with the electrodes of each oriented as indicated in Fig. 5A. A bus wire 30 is then welded to each emitter electrode, the weld being indicated by an X. Soft stainless steel wires, for example, are used for interconnections because they weld easily to the usual nickel alloy leads of the circuit components and to other steel wires. However, other suitable wires may be employed. A second row of the same number of transistors 10' is then connected to a second bus wire 31 in exactly the same manner. The two rows of transistors are then joined by gluing together the backs 32 of the transistors to form the arrangement shown in Figs. 5 and 5A. Bus wires 30 and 31, as indicated in Fig. 1, will be grounded.

Figure 6A:
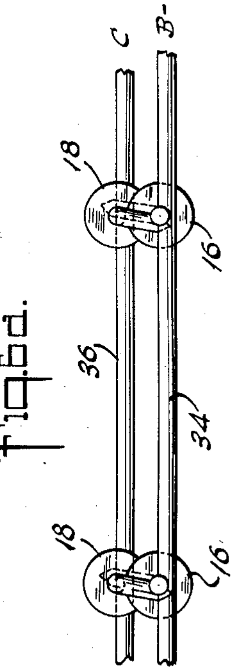
Figs. 5 to 7A show front and top views of three different sub-assemblies.
Figure 6:
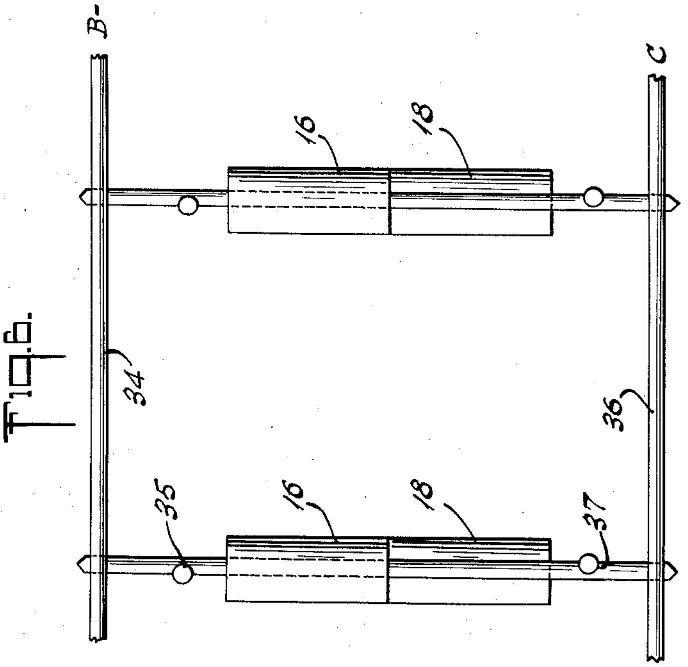

Using a suitable jig, a second sub-assembly is then formed, and this consists of parallel load resistors 16 and 18 connected to bus wires 34 and 36 as illustrated in Fig. 6. Resistors 16 and 18 are first connected in parallel by welding together their leads at the points 35 and 37, and then the pairs of resistors 16, 18 are fastened to bus wires 34 and 36 by welding at points X. Two identical sub-assemblies of the type shown in Fig. 6 are constructed so that one forms the load resistors for the upper transistors and the other provides the load resistors for the lower transistors.

Figure 7A:
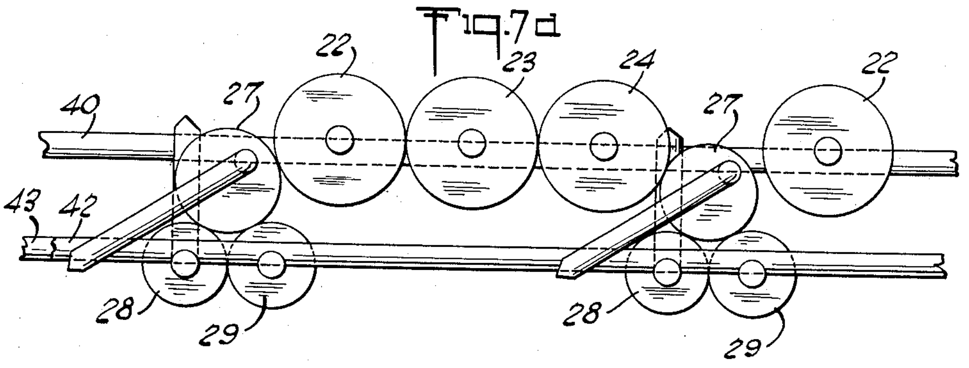
Figure 7:
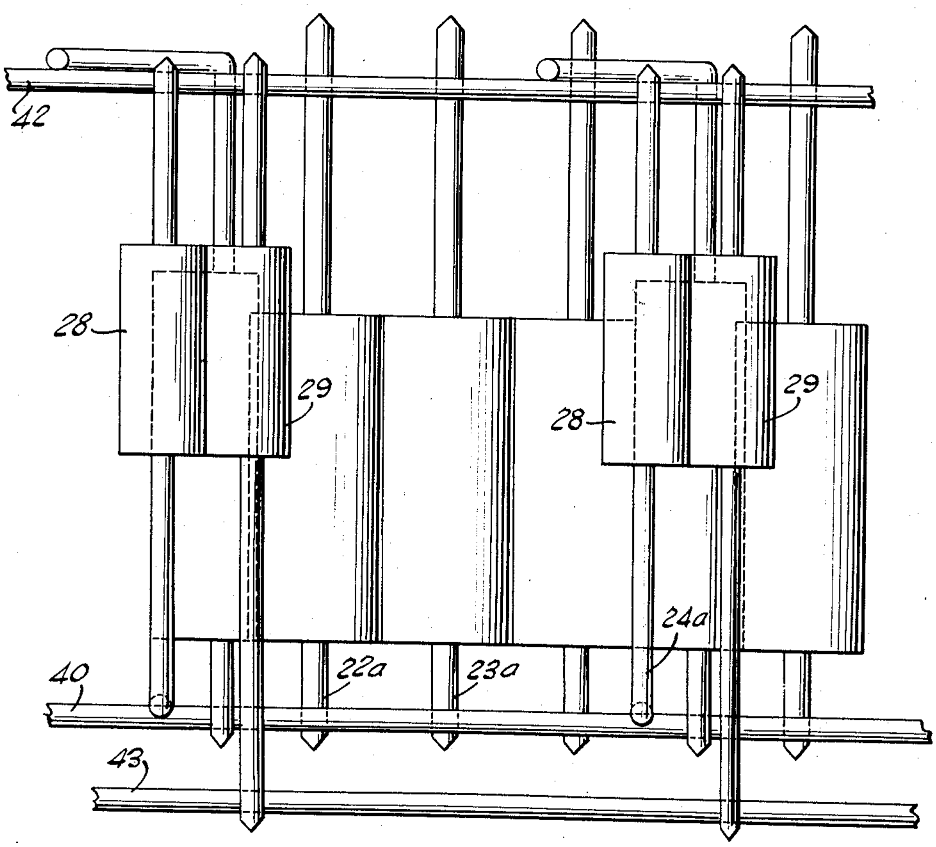

A pair of third sub-assemblies is then formed using suitable jigs not shown herein. Referring to Figs. 7 and 7A, the third sub-assembly consists of diodes 22—24, capacitor 27 and resistors 28, 29. The diodes have leads 22*a*, 23*a*, 24*a*, welded to a conductor or bus wire 40, corresponding to the junction point 25 of Fig. 1. Resistor 28, 29 and capacitor 27 have their upper leads welded to bus wire 42 which will be connected to the transistor base electrodes. The lower leads of resistors 29 are welded to bus wire 43, which is the +6 volt lead for supplying bias to the base electrodes. The upper leads of diodes 22—24 are left unconnected for the time being and eventually are connected by the logic wiring to suitable inputs 21.

After the three pairs of sub-assemblies have been formed, they are joined together as indicated in Figs. 3 and 4. As already described, the two first assemblies, comprising two rows of transistors and the emitter bus wires 30, 31 are joined by gluing together the backs of the transistors. Thereafter, the pair of second sub-assemblies is added, and wires 36 thereof are welded to the collector electrodes of the transistors, one of the bus wires of one assembly being welded to the collector electrodes of the upper transistors, and one bus wire of the other second assembly being welded to the collector electrodes of the lower transistor. It is to be noted that resistors 16 and 18 are spaced along bus wires 34 and 36 so that they fit between adjacent transistors. The third pair of sub-assemblies is then added. One of the third sub-assemblies is placed on one side of the rows of transistors, and the other is placed on the other side of the transistors, as shown in Figs. 3 and 4. The bus wires 42 of the third sub-assemblies are then welded to the base electrodes of the upper and lower transistors.

After the three pairs of sub-assemblies have thus been joined together, portions 44 of the base electrode bus wires 42 are cut away, and portions 45 of the collector bus wires 36 are cut away to individualize the connections to the various transistors. Also, portions 46 of bus wires 40 are cut away so that a limited number of diodes will be connected to each transistor. This technique of connecting bus wires to all electrodes and then clipping away portions gives the sub-assemblies greater strength and renders them less susceptible to damage during handling. The cut-outs 46 may be made betwen the diodes 22 and 23 or between the diodes 23 and 24 so that only one or two diodes will be joined to the base electrode of a given transistor, and four or even five diodes may be joined to the base electrode of an adjoining transistor. It will be understood that after the transistors have been interconnected as illustrated in Figs. 3 and 4, there will be a plurality of amplifiers equal to the number of transistors each having a circuit substantially as shown in Fig. 1. Various bus wires and other connections to the amplifiers may be extended to external connectors 50 by soldering, welding or any other means. The outputs and inputs of the amplifiers also are connected to suitable external connections and/or are interconnected according to any desired pattern by suitable wiring.

After the wiring has been completed by the addition of suitable interconnecting wiring which is not shown, the assemblies may be potted. A suitable resin 62 may be used for potting, and the potted unit preferably has a geometric form suitable for stacking, such as a rectangular cross-section. The potting produces a structure similar to reinforced concrete. In the potting compound 62, a number of tubes 64 may be placed. These tubes may extend vertically as well as horizontally through the potting compound.

The completed stick assemblies shown in Fig. 2 may be arranged in a cube as illustrated in Figs. 8 and 9, or other configurations. Herein 36 such sticks are shown in a single cubic package. A plurality of wires 66, 68 may be passed through the tubes 64 of the stick assemblies. The ends of the wires are connected to suitable anchoring devices 70 on a plurality of bars 72 on the sides of the cubic array. Anchoring devices 70 may be in the form of nuts adapted to engage threaded members fastened to the wires to place wires 66, 68 under tension. In this manner, the package is securely fastened together. At the bottom of the package vertical wires 66 may be fastened to a cooling plate 76 (Fig. 9) capable of supporting the package.

For the purposes of obtaining better heat removal, a plurality of heat conducting or metal sheets 74 may be placed along the sides of the amplifier sticks as indicated schematically in Fig. 9 and the bottom of the metal sheets 74 may be connected to a heat exchanger 76. The heat exchanger is made strong enough to support the package and may be provided with means 78 for mounting it on a suitable vehicle or other structure. The heat exchanger or cold plate 76 may be provided with vanes or fins or other heater transfer means 80 arranged for permitting air or liquid to flow therethrough, so as to provide an efficient high capacity heat removal, construction. Vertical and horizontal wires such as wires 66 and 68 are also used in the structure of Fig. 9 and the vertical wires may be fastened to cold plates 76.

The assemblies may have shapes other than those shown in Fig. 2, depending on the particular applications. Thus, in some instances it may be desirable to make the assemblies in the shape of wafers 81, Fig. 10, instead of sticks. This may be so where the components are so small that the cross-sections of the stick-shaped assemblies are too small to accommodate the required terminals. In the wafer construction, two rows of transistors may be placed side by side instead of back to back. The several sub-assemblies are joined together in a manner similar to that already described. The sub-assemblies may be placed with their components extending horizontally instead of vertically. If desired several assemblies may be placed in the same plane so as to form a substantially flat rectangular wafer of the general form shown in Fig. 9. Such a wafer has a much larger area for terminals or external connectors 82, since the terminals may be placed on all sides 83 and 84 of the wafer. The interconnecting wiring can be formed in a manner similar to that already described, except that bus wires will run in two directions to the terminals on all four sides of the assembly.

An assembly of the type shown in Figs. 8 and 9 may be formed by simply stacking a plurality of wafers 81. In such a construction only the vertical wires 66 will be required.

As used herein the language "individual electronic component" encompasses a simple electronic element such as 24 in Fig. 4 or plural elements such as 16 and 18 in Fig. 6.

For the purposes of illustrating the invention, I have shown some exemplary embodiments thereof, but many variations and modifications of the technique herein disclosed will be apparent to those skilled in the art.

We claim:

1. The method of making a self-supporting electronic circuit assembly, which comprises welding the respective leads extending from opposite ends of individual electronic components of said assembly to one of a plurality of spaced flexible conductors located at the opposite ends of the components, packing the electronic components together substantially contiguously, bracing said flexible conductors by connecting each conductor by means of said components to a plurality of other of said conductors thereby forming a rigid self-supporting structure.

2. The method according to claim 1 including the step of embedding the assembly within an insulating compound with the welded conductors and leads forming reinforcing members for the embedded assembly.

3. The method according to claim 1, comprising the step of making numerous welds in addition to those required for electrical connection, and cutting the conductors so as to remove unwanted connections and leave only the required circuit wiring.

4. The method for assembling repetitive circuits, comprising forming rigid sub-assemblies by connecting similar groups of closely spaced electrical components between parallel flexible bus wires each of which extends along all said groups of components by welding the leads of said components to the bus wires, filling the spaces between said groups of components with other components strung on and fastened to other parallel bus wires and interconnecting the bus wires and the components so that without any rigid members they form a rigid self supporting structure.

5. The method of constructing self-supporting electronic assemblies without rigid support members comprising the steps of joining a first bus wire to a first electrode of each of a first row of $n$ spaced electronic devices having a plurality of electrodes on a front face thereof and joining a second bus wire to a first electrode of a like second row of electronic devices, fastening together the thus assembled electronic devices of the first and second rows in pairs, connecting circuit elements across each of two pairs of bus wires in spaced relationship, joining one bus wire of each pair to second electrodes of said devices of each row with said elements between adjacent ones of said spaced electronic devices, joining $n$ groups of electrical components to parallel bus wires to form one sub-assembly and joining another series of $n$ groups of components to other bus wires to form another sub-assembly, connecting one bus wire of each sub-assembly to third electrodes of said devices with the electrical components adjacent to said devices and parallel to the axes thereof, the elements being dimensioned, arranged and so closely packed together that they form a rigid structure.

6. The method of constructing self-supporting electronic assemblies requiring no rigid supports comprising the steps of joining a first bus wire to a first electrode of each of a first row of $n$ spaced electronic devices having their electrodes on a front face thereof and joining a second bus wire to the first electrodes of a like second row of $n$ electronic devices, joining the thus assembled electronic devices of the two rows back to back, connecting resistors across each of two pairs of bus wires in spaced relationship, joining one bus wire of each pair to a second electrode of one row of electronic devices with the resistors parallel to the axes of the electronic devices, joining $n$ groups of vertically extending electrical components to upper and lower parallel bus wires to form one sub-assembly and joining another series of $n$ groups of components to other upper and lower bus wires to form another sub-assembly, connecting one bus of each sub-assembly to third electrodes of the two rows of electronic devices with the electrical components adjacent to the electronic devices and parallel to the axes thereof, and removing portions of the bus wires connected to the second and third electrodes.

7. The method of constructing electronic assemblies in which the electronic components and wiring form a self-supporting structure, comprising the steps of welding a first bus wire to the emitter electrode of each of a first row of $n$ spaced cylindrical transistors having their electrodes on a front face thereof and welding a second bus wire to the emitter electrodes of a like second row of $n$ transistors, fastening the thus assembled transistors of the two rows back to back, welding resistors across each of two pairs of bus wires in spaced relationship, welding one bus wire of each pair to the collector electrodes of one row of transistors with the resistors parallel to the axes of the transistors and between adjacent transistors, welding $n$ groups of vertically extending electrical components to upper and lower parallel bus wires to form one sub-assembly and welding another series of $n$ groups of components to other upper and lower bus wires to form another sub-assembly, connecting one bus wire of each sub-assembly to the base electrodes of one row of transistors with the electrical components adjacent to the transistors and parallel to the axes thereof, removing portions of the bus wires connected to the base and collector electrodes, adding interconnecting wiring between the transistors and potting the assembled elements.

8. The method of constructing electronic assemblies in which the electronic components and wiring form a self-supporting structure, comprising the steps of welding a first bus wire to the emitter electrode of each of a first row of $n$ spaced cylindrical transistors having their electrodes on a front face thereof and welding a second bus wire to the emitter electrodes of a like second row of $n$ transistors, gluing the thus assembled transistors of the two rows back to back, welding resistors across each of two pairs of bus wires in spaced relationship, welding one bus wire of each pair to the collector electrodes of one row of transistors with the resistors parallel to the axes of the transistors and located between adjacent transistors, welding $n$ groups of vertically extending electrical components to upper and lower parallel bus wires to form one sub-assembly and welding another series of $n$ groups of components to other upper and lower bus wires to form another sub-assembly, mounting said sub-assemblies one on each side of the rows of transistors, connecting one bus wire of each sub-assembly to the base electrodes of one row of transistors with the electrical components adjacent to the transistors and parallel to the axes thereof, removing portions of the bus wires connected to the base and collector electrodes, connecting terminals to the bus wires at each end of the assembly, adding interconnecting wiring between the transistors and potting the assembled elements.

9. A method according to claim 8, comprising the steps of arranging the input components so that $m$ components of a given type are adjacent each transistor and have one terminal connected to one bus wire, and cutting said bus wire between adjacent transistors so that different numbers of said components are electrically connected to said transistors.

10. A method of constructing a rigid self-supporting electronic assembly without rigid supporting members, comprising the steps of connecting a first bus wire directly to a first electrode of each of a row of spaced electronic discharge devices having the same orientation, similarly connecting another bus wire to first electrodes of a like second row of spaced electronic discharge devices, fastening the discharge devices of the first and second rows together, forming a plurality of different pairs of like sub-assemlies by connecting in each sub-assembly substantially identical groups of circuit components to parallel spaced bus wires, the spacing of the groups of components along the bus wires being similar to the spacing of the electronic discharge devices, placing said sub-assemblies adjacent and alongside the electronic discharge devices with the bus wires of a pair of sub-assemblies extending adjacent like electrodes of the first and second rows, respectively, of the electronic discharge devices, connecting the last-mentioned bus wires to their adjacent electrodes and severing said bus wires between adjacent electronic discharge devices so that each group of components is connected to one electronic discharge device.

11. In combination, a plurality of potted elongated electronic assemblies of substantially rectangular cross section arranged in an array, a plurality of wires each extending transversely through a plurality of said potted assemblies between opposite sides of the array, and means on said sides of the array for anchoring said wires under tension, a heat conducting base, said assemblies being mounted in a two-dimensional array on said metallic base, and a plurality of heat conducting members connected to said base and extending through said array.

12. Apparatus according to claim 11, wherein said base includes means for conducting fluid coolant therethrough.

13. An electronic circuit assembly comprising a plurality of electronic components located in parallel and substantially contiguous relationship, said components being arranged in an elongated column so that their leads extend in opposite directions transversely to the length of the column, a plurality of flexible conductors on each of the opposite sides of said components extending transversely to said leads and joined to respective ones thereof, a plurality of said conductors extending along the length of said column, selected ones of said conductors being connected to selected leads of said components at each of said opposite sides, certain of said components comprising leads at their adjacent ends connected to the same conductor having leads at their other adjacent ends connected to different respective conductors, said conductors and said electronic components alone constituting means for forming a self-supporting rigid structure for said assembly and said conductors providing the electrical connections to the electronic components.

14. An electronic assembly comprising a first row of $n$ spaced transistors having a plurality of electrodes on a front face thereof and a second row of $n$ similarly spaced transistors placed back to back with the first row of transistors and fastened thereto, a bus wire extending over the front faces of the transistors of each row and connected to a first electrode thereof, additional substantially parallel bus wires extending over the front faces of the first and second rows of transistors, certain of said bus wires being connected to second and third electrodes of each of said transistors, and $n$ groups of electrical components adjacent and parallel to the axes of the transistors and joined to bus wires on opposite sides of the rows of transistors, and a potting compound encapsulating said electronic assembly.

15. An electronic assembly comprising a first row of $n$ spaced transistors having a plurality of electrodes on a front face thereof and a second row of $n$ similarly spaced transistors placed back to back with the first row of transistors and fastened thereto, a bus wire extending over the front faces of the transistors of each row and connected to a first electrode thereof, additional substantially parallel bus wires extending over the front faces of the first and second rows of transistors, certain of said bus wires being connected to second and third electrodes of each of said transistors, circuit elements located between adjacent transistors and arranged parallel to the axes of the transistors and connected between bus wires on opposite sides of said rows of transistors, and $n$ groups of electrical components adjacent and parallel to the axes of the transistors and joined to bus wires on opposite sides of the rows of transistors, and a potting compound encapsulating said electronic assembly.

References Cited in the file of this patent

UNITED STATES PATENTS

| | | |
|---|---|---|
| 1,640,282 | Migliaccio | Aug. 23, 1927 |
| 2,298,089 | Veenboer | Oct. 6, 1942 |
| 2,354,598 | Janz | July 25, 1944 |
| 2,505,531 | Ellwood | Apr. 25, 1950 |
| 2,613,252 | Heibel | Oct. 7, 1952 |
| 2,815,472 | Jackson | Dec. 3, 1957 |
| 2,824,264 | Anastopoulos | Feb. 18, 1958 |
| 2,857,558 | Fiske | Oct. 21, 1958 |